Nov. 12, 1929.   A. N. GOLDSMITH   1,735,113
COMBINED ELECTRIC PHONOGRAPH RECORDER AND REPRODUCER
Filed Jan. 23, 1925    2 Sheets-Sheet 1

Inventor
ALFRED N. GOLDSMITH
By his Attorney

Nov. 12, 1929.   A. N. GOLDSMITH   1,735,113
COMBINED ELECTRIC PHONOGRAPH RECORDER AND REPRODUCER
Filed Jan. 23, 1925   2 Sheets-Sheet 2
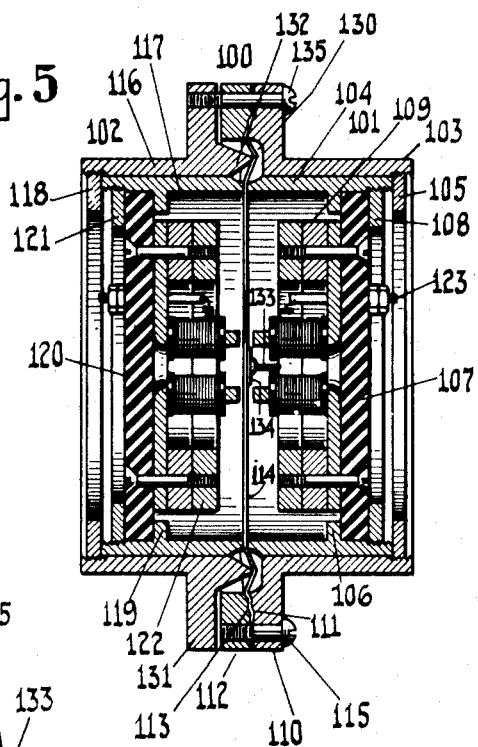
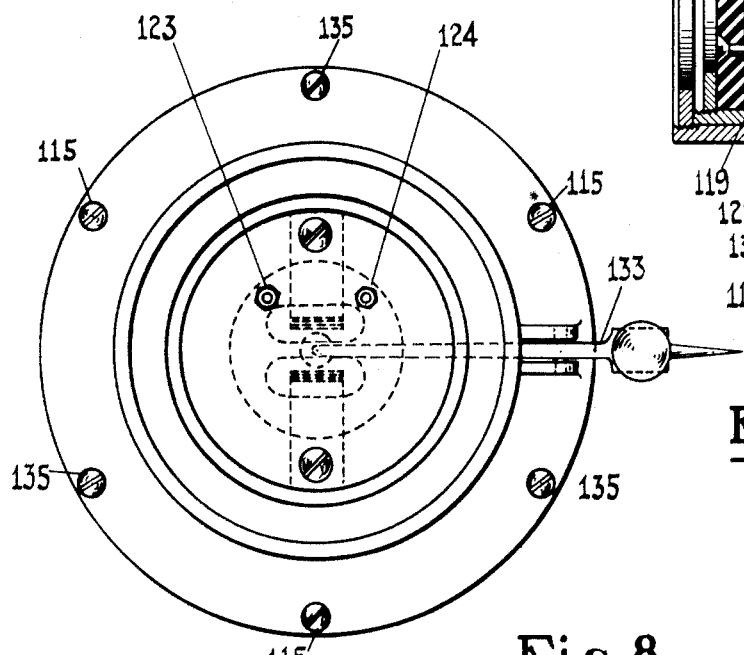
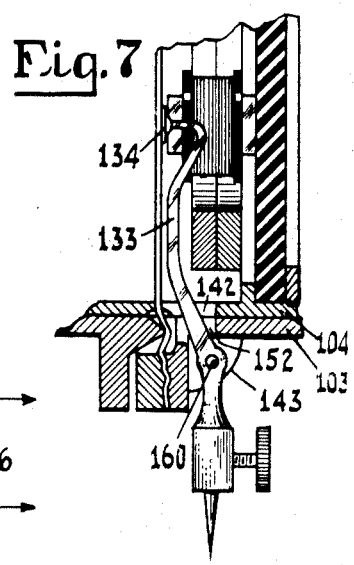
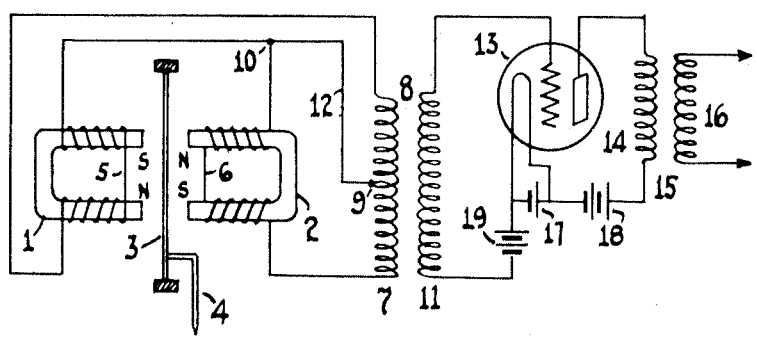
Inventor
ALFRED N. GOLDSMITH
By his Attorney Patented Nov. 12, 1929

1,735,113

UNITED STATES PATENT OFFICE

ALFRED NORTON GOLDSMITH, OF NEW YORK, N. Y., ASSIGNOR TO RADIO CORPORATION OF AMERICA, A CORPORATION OF DELAWARE

COMBINED ELECTRIC PHONOGRAPH RECORDER AND REPRODUCER

Application filed January 23, 1925. Serial No. 4,155.

My invention relates to electric phonograph apparatus, and, more particularly, to a combined electric phonograph recorder and reproducer by means of which the sound undulations of a phonograph record may be changed into corresponding electrical current variations and, conversely electric current variations, suitably produced by the sound it is desired to record, may cause undulations to be cut into a blank record.

Electric phonographs are superior to the ordinary mechanical phonographs for the following reasons: In the ordinary mechanical phonograph all the energy necessary to supply the sound is derived from the sound undulations in the grooves of the record operating against the stylus as the record moves relative thereto. Since this energy is considerable, the stylus and record become very easily worn with the consequent reduction in the quality of sound reproduced. In the electric phonograph only sufficent energy to operate the current varying device must be obtained from the motion of the record. This energy may be very small since it can be amplified to any desired intensity by means of the amplifier. Therefore, the record will not wear out so easily as in the case of a mechanical phonograph.

An object of the invention is to produce a combined reproducer and recorder of the above type which is reversible, so that it can record on a blank record electrical current variations fed to it and can also reproduce the mechanical impulses fed to it by the stylus bearing against the record undulations into electric current variations.

A further object is to provide a combined recorder and re-producer which will operate on a push-pull principle thereby doubling the output of the ordinary single acting arrangement and giving rise to numerous other advantages which will hereinafter be pointed out more in detail.

A further object is to provide a combined electric phonograph recorder and reproducer using a diaphragm which is stretched to a very high degree so that its natural period is far above audibility, thereby doing away with the undesirable resonance effects which are present in the usual unstretched diaphragms.

Further object will be apparent as the description proceeds and from the appended claim when considered with the accompanying drawing, in which:

Fig. 5 shows a section of my preferred modification.

Fig. 6 shows an end view of the device shown in Fig. 5.

Fig. 7 shows a portion of a section taken at right angles to the section in Fig. 5.

Fig. 8 is a schematic arrangement illustrating the principle of operation of my invention when used for reproducing.

Figure 4:
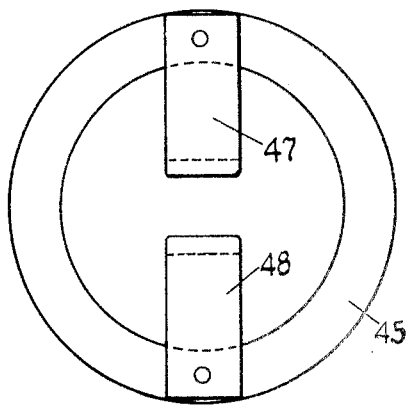
Fig. 4 shows a detail of the magnetic circuit.

Referring first to Fig. 8, 3 denotes a diaphragm of magnetic material to which is fastened a stylus 4. The diaphragm may be the usual unstretched diaphragm or it may be stretched to a considerable degree so that its natural period of vibration is well above the range of audibility. Symmetrically mounted on each side of the diaphragm 3 are permanent magnets 1 and 2, the north pole of each being disposed directly opposite the south pole of the other.

Permanent magnet 1 is provided with a winding 5 which is arranged in series with a similar winding 6 provided on permanent magnet 2. These serially connected windings are connected across coil 7 of transformer 8. The windings 5 and 6 are so connected that when the diaphragm is moved from its normal position by stylus 4, the voltages induced in these windings by the change in flux in magnets 1 and 2 will add. A jumper 12 may be provided between the point 10 where the two windings 5 and 6 are connected together and a mid-point 9 of the coil 7. The coil 11 of transformer 8 is connected to the input circuit of the amplifiying tube 13. The output circuit of amplifier 13 is connected to coil 14 of transformer 15. The coil 16 of transformer 15 may be connected to another amplifier (not shown) or to a loud speaker (not shown), as the case may be. The filament of tube 13 is heated by means of battery 17, plate voltage being supplied by means of B-battery 18 and grid bias voltage supplied by C-battery 19.

It will be noted that the arrangement is a double magnetic reversible receiver, both magnets operating on the same diaphragm, a feature which is not feasible for the ordinary use of a telephone receiver, but perfectly acceptable when all motion of the diaphragm results from or causes motion of an attached stylus.

The following advantages are inherent in a device made according to my invention.

1. The stretched diaphragm avoids distortion due to its natural period being well above the limits of audibility, as pointed out above.

2. The push-pull arrangement doubles the output since it is equivalent to two separate receivers or transmitters.

3. The push-pull arrangement reduces distortion through harmonics by partially neutralizing them. In my device the diaphragm responds theoretically absolutely faithfully to current variations, and vice versa, while in the usual electromagnetic receiver the relation between movement of diaphragm and variation in current is not theoretically faithful.

4. The structure is magnetically balanced and therefore gives more nearly a linear response, thus again reducing harmonic distortion. This is true since there is no resultant magnetic stress on the diaphragm when no current is flowing through the windings of magnets 1 and 2.

5. The arrangement is both a receiver for recording blank records, and a transmitter for normal electric phonograph operation. The operation of my combined electric phonograph recorder and reproducer when acting as a reproducer will now be briefly explained.

It will easily be seen that when the diaphragm is forced towards the magnet 2 by the stylus 4, the flux through the magnet 2 is increased and that through magnet 1 is decreased. This change in flux causes voltages to be induced in the windings 5 and 6 which add. This resultant voltage will vary with the displacement of the diaphragm from normal or mid-position.

The voltage caused by the change in flux threading the windings 5 and 6 is impressed across the grid-filament circuit of thermionic tube 13 by means of transformer 8. The tube 13 amplifies the energy which may be fed to further amplifiers (not shown) or a loud speaker (not shown) by means of the transformer 15.

When my combined electric phonograph recorder and reproducer operates as a recorder, current will be fed to the windings 5 and 6 from a suitable source (not shown). When current flows thru the windings 5 and 6 in a given direction, the magnet 1 will be weakened and the magnet 2 strengthened. The diaphragm 3 will be attracted towards magnet 2 with a force equal to the difference of the forces exerted by the two magnets 1 and 2. The force of attraction of the diaphragm and hence the displacement will be substantially proportional to the current in the windings 5 and 6.

Having described the manner of operation of my invention, I will now describe some of the structures I have devised by means of which the operation can be carried out in practice.

Figure 3:
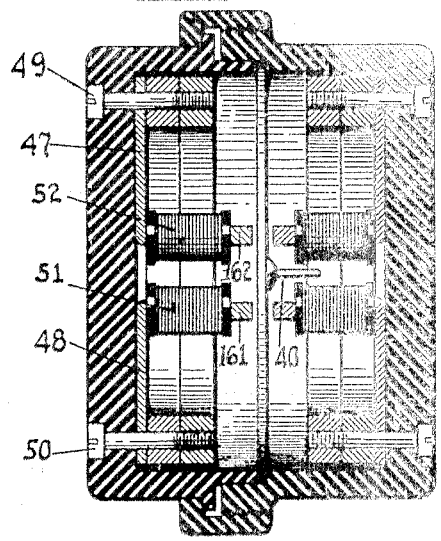
Fig. 3 is a cross-section of the device shown in Figs. 1 and 2 taken at right angles to the section shown in Fig. 1.
Figure 2:
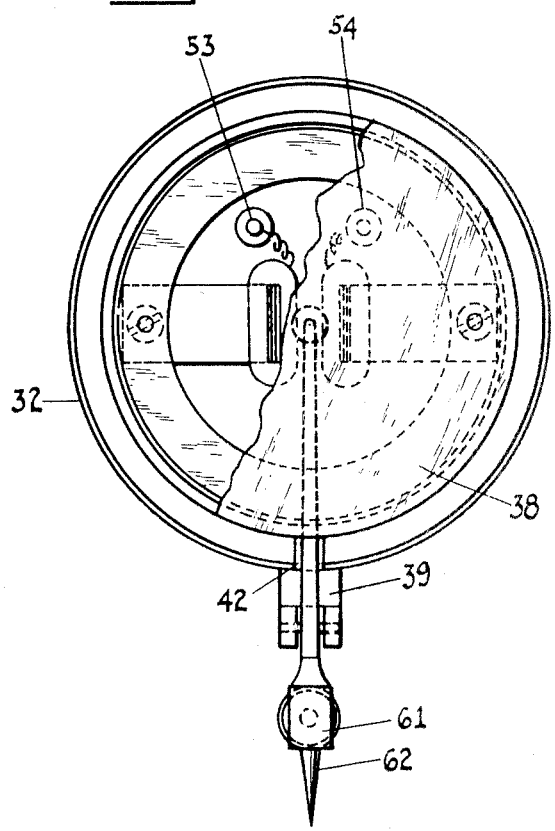
Fig. 2 shows an elevation of Fig. 1 with the left half of the casing removed and with the diaphragm partially broken away.
Figure 1:
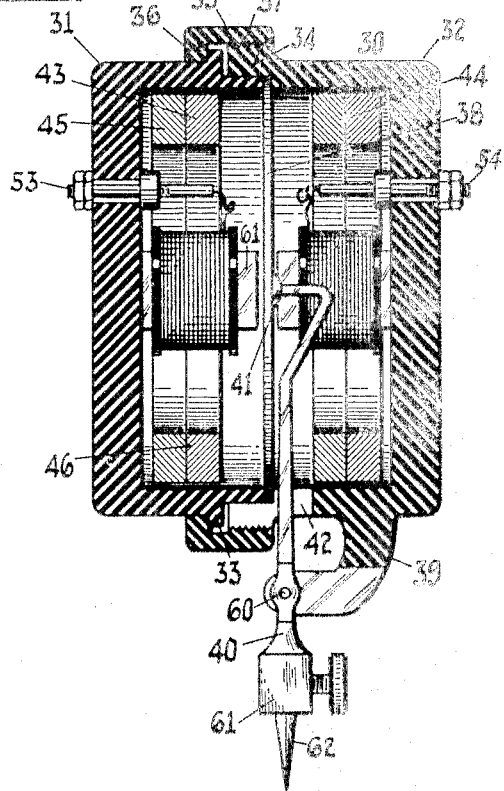
Fig. 1 shows a partial cross-section of a device embodying some of the principles of my invention.

Referring now to Figs. 1, 2, 3 and 4, casing 30 is divided into two parts 31 and 32. The part 31 is provided with an annular flange 33 and the part 30 is provided with a screw threaded portion 34. An annular member 35, provided with a shoulder 36 and a threaded portion 37 cooperating respectively with the shoulder 33 and threaded portion 34, operates to clamp the parts 31 and 32 together with the diaphragm 38 therebetween. The part 32 is provided with a forked arm 39 to which is pivoted stylus 40 by means of pivot 60. The upper end of the stylus 40 is fastened to the diaphragm 38 at point 41 in any suitable manner as by solder or riveting. The lower end of the stylus is provided with the usual needle holder 61 which holds needle 62. The part 32 is provided with a slot 42 to allow the stylus 40 movement.

Arranged on opposite sides of the diaphragm 38 are the magnets 43 and 44. These magnets are identical and are mounted in their respective half casings in the same manner, so a description of the structure and mounting of one will suffice for both.

The magnet 43 is composed of two rings 45 and 46 and two angle members 47 and 48. The rings 45 and 46 and the angle members 47 and 48 are suitably clamped together and to the part 31 by means of bolts 49 and 50 screw threaded into the ring 46. Mounted on the projecting legs 161 and 162 of the angle members 47 and 48 are windings 51 and 52, suitably connected together so that their magneto motive forces add.

Mounted in each half 31 and 32 of the casing 30 is a pair of binding posts 53 and 54 to which the windings of the respective magnets are connected. The parts 31, 32 and annular member 35 may be made of insulating material while the magnets 43 and 44 and diaphragm 38 will be made of suitable magnetic material.

Referring now to Figs. 5 and 6 wherein I have shown a preferred embodiment, the casing 100 is divided into two parts 101 and 102. Part 101 comprises an outer shell 103 having a sleeve 104 fitted within and held against longitudinal movement relative thereto in one direction by the annular screw threaded ring 105 which is screw threaded to shell 103. The sleeve 104 has an annular inwardly projecting shoulder 106, against which fits the circular plate 107 which is held in that position by the aid of ring 108 screw threaded to sleeve 104.

Secured to the plate 107 is a magnet 109. This magnet is identical with the magnets 43 and 44 described in connection with Figs. 1, 2, 3 and 4. It is mounted on the plate 107 in the same way the magnets 43 and 44 are mounted on the parts 31 and 32.

The shell 103 has a projecting annular flange 110 having a roughened radial surface 111 ending in an annular depression 130. Cooperating with flange 110 is an annular member 112 having a roughened surface 113. The diaphragm 114 is clamped between roughened surfaces 111 and 113 by means of bolts 115. The diaphragm 114 is of stretched steel so that its natural period is well above audibility.

Part 102, like part 101, consists of a shell 116 having a sleeve 117 fitting therein and held against longitudinal movement relative thereto in one direction by an annular screw threaded member 118. Sleeve 118 has an inwardly projecting annular flange 119 against which is clamped circular plate 120 by means of the annular member 121 screw-threaded to sleeve 117.

Secured to the plate 120 is a magnet 122. This magnet is of identical construction with magnet 109 and is secured to plate 120 in identically the same way as magnet 109 is secured on plate 107.

The shell 116 has a radially projecting annular flange 131 and a longitudinally projecting annular rib 132 with a ridge for engaging the diaphragm 114. The annular flange 131 is secured to annular flange 110 by means of bolts 135 passing thru the diaphragm 114 and ring 112.

To the center of the diaphragm 114 is secured the stylus 133. Since the diaphragm 114 is quite thin and is stretched to a relatively high degree, it has been found that, if the stylus 133 engages a small area of the diaphragm 114, as, for instance, is the case of the stylus 40 in Figs. 1, 2, 3 and 4 which engages a small area of the unstretched diaphragm 38, only a very small area of the diaphragm surrounding the area of contact of the stylus will respond to movement of the stylus. Consequently a plate 134 must be first secured to the stretched diaphragm 114 and then stylus 133 may be appropriately secured to the plate 134, as by riveting or soldering.

The stylus 133 passes thru a slot 142 in sleeve 104 and opening 152 in shell 103 and is pivoted between ears 143 projecting from shell 103 by means of pivot pin 160.

Mounted in each plate 107 and 120 is a pair of binding posts 123, and 124, to each pair of which is connected the appropriate windings of the magnets 109 and 122.

To assemble the structure and stretch the diaphragm 114, the diaphragm 114 is first clamped securely between flange 110 and ring 112. The sleeve 104 is inserted within the shell 103 to the position shown and then secured there by ring 105. The shell 116 is then secured to shell 103 and the securing bolts 135 drawn up till the annular projection 132 forces the portion of the diaphragm 114 it engages well into the annular depression 130, thereby stretching the diaphragm to the desired degree.

The stylus 133 is then secured to the diaphragm 114 and pivoted to the shell 103 in the manner above described. The sleeve 117 is placed in position within shell 116 against the diaphragm 114 and secured there by ring 118. The plates 107 and 120 with the magnet structures 109 and 122 together with binding posts 123 and 124 are placed against the flanges 106 and 119 and secured there by rings 108 and 121 after suitable connections of the windings to the binding posts have been made.

The magnets 109 and 122 may be made of any suitable material. The stretched diaphragm 114 may be made of steel. The plates 107 and 120 may be made of suitable insulating material. The shells 103 and 116, and sleeves 104 and 117 may be made of any suitable material such as brass.

Having described several embodiments of my invention I am entitled to all modifications thereof as fall fairly within the spirit and scope of the following claim:

A combined reproducer and phonograph recorder comprising a two part shell casing, a projecting flange having an annular depression below a roughened radial surface, on one part of said casing, a cooperating ring for said flange, a circular metallic diaphragm between said ring and flange, bolts for securing the diaphragm to said ring and flange, a projecting annular flange on the other part of said casing, bolts for drawing said last mentioned part of said casing to the first mentioned casing part, an axially projecting annular rib on said flange for pressing said diaphragm into said depression when the bolts for drawing together the two casing parts are tightened, a sleeve having an internal annular shoulder within each part of said casing, annular screw rings within each casing part for moving the sleeves together, a circular disc in each sleeve, screw threaded rings for clamping said discs against the annular shoulders within said sleeves, electromagnets mounted on said discs and on opposite sides of said diaphragm and a stylus fastened at one end to the diaphragm and intermediate its ends to one part of said casing.

ALFRED NORTON GOLDSMITH.